US012782713B2

(12) United States Patent
Wu et al.

(10) Patent No.: US 12,782,713 B2
(45) Date of Patent: Nov. 3, 2026

(54) OPTICAL MODULE

(71) Applicant: Actutek Corporation, Taoyuan City (TW)

(72) Inventors: Ya-Hsiu Wu, Taoyuan City (TW); Yi-Ho Chen, Taoyuan City (TW); Chih-Wen Chiang, Taoyuan City (TW)

(73) Assignee: ACTUTEK CORPORATION, Taoyuan City (TW)

( * ) Notice: Subject to any disclaimer, the term of this patent is extended or adjusted under 35 U.S.C. 154(b) by 355 days.

(21) Appl. No.: 18/593,376

(22) Filed: Mar. 1, 2024

(65) Prior Publication Data

US 2024/0295744 A1 Sep. 5, 2024

Related U.S. Application Data

(60) Provisional application No. 63/449,410, filed on Mar. 2, 2023.

(51) Int. Cl.

| | |
|---|---|
| ***G02B 26/08*** | (2006.01) |
| ***G02B 7/18*** | (2021.01) |
| *G03B 5/00* | (2021.01) |
| *G03B 30/00* | (2021.01) |

(52) U.S. Cl.
CPC ....... *G02B 26/0883* (2013.01); *G02B 7/1805* (2013.01); *G03B 5/00* (2013.01); *G03B 30/00* (2021.01); *G03B 2205/003* (2013.01)

(58) Field of Classification Search
CPC .... G02B 26/0883; G02B 7/1805; G03B 5/00; G03B 30/00; G03B 2205/003
USPC .......................................................... 359/833
See application file for complete search history.

(56) References Cited

U.S. PATENT DOCUMENTS

2020/0333558 A1* 10/2020 Wu ...................... G02B 27/646

* cited by examiner

*Primary Examiner* — George G. King
(74) *Attorney, Agent, or Firm* — MUNCY, GEISSLER, OLDS & LOWE, P.C.

(57) ABSTRACT

An optical module is provided, including a fixed portion, a movable portion, and a driving component. The movable portion is connected with an optical element. The driving component is configured to drive the movable portion to move relative to the fixed portion. The movable portion is movable within a range of motion relative to the fixed portion.

18 Claims, 13 Drawing Sheets

OPTICAL MODULE

CROSS REFERENCE TO RELATED APPLICATIONS

This application claims the benefit of U.S. Provisional Application No. 63/449,410, filed Mar. 2, 2023, the entirety of which is incorporated by reference herein.

BACKGROUND OF THE INVENTION

Field of the Invention

The present invention relates to an optical module, and, in particular, to an optical module with a restraining component.

Description of the Related Art

With the development of technology, many electronic devices (such as laptops, smart phones or digital cameras) now have the function of taking pictures or recording videos. The usage of these electronic devices is becoming increasingly prevalent, driven not only by their convenience and slim designs but also by the demand for more stable and higher-quality optics to offer users a wider array of choices.

The aforementioned electronic devices with photography or video functions usually include one or more lenses to achieve focusing, zooming and/or optical image stabilization (OIS) functions. Therefore, the optical element driving mechanism usually includes a movable portion that carries the optical elements. However, conventional optical modules experience a deterioration in focusing performance when subjected to vibrations caused by impacts. In light of this, designing an optical module capable of preventing abnormal movements relative to the fixed portion of the movable portion becomes an important challenge.

BRIEF SUMMARY OF THE INVENTION

An embodiment of the present disclosure provides an optical module, including a fixed portion, a movable portion, and a driving component. The movable portion is connected with an optical element. The driving component is configured to drive the movable portion to move relative to the fixed portion. The movable portion is movable within a range of motion relative to the fixed portion.

According to some embodiments of the present disclosure, the optical module further includes a restraining component to restrain abnormal movement of the movable portion relative to the fixed portion. The restraining component includes a first restraining element, a first containing structure and a first linking structure. The first restraining element is made of plastic material and is in direct contact with the movable portion and the fixed portion. The first containing structure has a recessed structure. The first restraining element is at least partially located in the first containing structure. The first linking structure directly contacts the first restraining element and is at least partially located in the first containing structure.

According to some embodiments of the present disclosure, the fixed portion includes a surface. The first containing structure is recessed from the surface along a recessed direction. When viewed in a direction perpendicular to the recessed direction, the first linking structure at least partially overlaps with the first containing structure. The first linking structure has a long strip structure and extends in a direction parallel to the recessed direction.

According to some embodiments of the present disclosure, the length of the first linking structure extending into the first restraining element in the recessed direction is at least more than 0.05 mm. The first linking structure is made of metal.

According to some embodiments of the present disclosure, the first linking structure is made of different materials than the surface. When the movable portion is located at any position in the range of motion, the first linking structure does not directly contact the first containing structure.

According to some embodiments of the present disclosure, the restraining component further includes a second restraining element, a second linking structure and a first reinforcing element. The second restraining element is arranged with the first restraining element along a first arrangement direction. The second linking structure directly contacts the second restraining element. The first reinforcing element is made of magnetically permeable material, and is located between the first linking structure and the second linking structure. The first reinforcing element corresponds to the driving component.

According to some embodiments of the present disclosure, the first linking structure and the second linking structure have an integrally formed structure. The first arrangement direction is not parallel to the recessed direction.

According to some embodiments of the present disclosure, the movable portion includes a carrier connected to the optical element, and the carrier is made of plastic material.

According to some embodiments of the present disclosure, the first linking structure is fixedly disposed on the carrier. The first linking structure is at least partially embedded in the carrier. The first reinforcing element is fixedly disposed on the carrier.

According to some embodiments of the present disclosure, the optical module further includes a support component. The movable portion is movable relative to the fixed portion via the support component. The support component includes a support element that is movable relative to the movable portion or the fixed portion.

According to some embodiments of the present disclosure, the restraining component further includes a second reinforcing element. The support element corresponds to the second reinforcing element. The second reinforcing element has a plate-like structure. The second reinforcing element and the support element are made of metal material.

According to some embodiments of the present disclosure, the support element is fixedly connected to the second reinforcing element. The second reinforcing element and the first reinforcing element have an integrally formed structure. The second reinforcing element is fixedly disposed on the carrier. The second reinforcing element is at least partially embedded in the carrier.

According to some embodiments of the present disclosure, the support component further includes an elastic element. The movable portion is movably connected to the fixed portion via the elastic element. The elastic element includes a movable portion fixed end, a fixed portion fixed end and an elastic portion. The movable portion fixed end is fixedly connected to the movable portion. The fixed portion fixed end is fixedly connected to the fixed portion. The elastic portion has a flexible structure. The movable portion fixed end is movable relative to the fixed portion fixed end via the elastic portion. The fixed portion includes a fixing element. The fixed portion fixed end is disposed on the fixing element. The elastic element and the fixing element both have a plate-like structure. A thickness direction of the elastic element and a thickness direction of the fixing element are parallel to each other.

According to some embodiments of the present disclosure, the fixing element further includes a first opening, a second opening, a third opening and a fourth opening. When viewed along the thickness direction of the fixing element, the movable portion fixed end is at least partially exposed from the first opening. When viewed along the thickness direction of the fixing element, the movable portion fixed end is at least partially exposed from the second opening. When viewed along the thickness direction of the fixing element, the fixed portion fixed end is at least partially exposed from the third opening. When viewed along the thickness direction of the fixing element, the fixed portion fixed end is at least partially exposed from the fourth opening.

According to some embodiments of the present disclosure, an arrangement direction of the first opening and the second opening is different from an arrangement direction of the third opening and the fourth opening. The area of the first opening is larger than the area of the second opening.

According to some embodiments of the present disclosure, a line connecting a center of the third opening and a center of the fourth opening does not pass through a center of the fixing element when viewed in the thickness direction of the fixing element. The line connecting the center of the third opening and the center of the fourth opening partially overlaps the second opening when viewed along the thickness direction of the fixing element.

According to some embodiments of the present disclosure, the restraining component further includes a first setting portion, a second setting portion and a third restraining element. The third restraining element is made of plastic material. The third restraining element is in direct contact with the movable portion and the fixed portion. The third restraining element is disposed on the first setting portion and the second setting portion. The first setting portion and the second setting portion are respectively located on the movable portion and the fixed portion. The first setting portion does not overlap the second setting portion in a extending direction of the first setting portion.

According to some embodiments of the present disclosure, the first arrangement direction and a second arrangement direction are located on opposite sides of the center of the optical element when viewed along a first axis. The first arrangement direction and the second arrangement direction are located on opposite sides of the center of the optical element when viewed along a second axis.

According to some embodiments of the present disclosure, the first restraining element, the second restraining element and the third restraining element are located on an imaginary plane. The imaginary plane is not parallel to the first axis. The imaginary plane is not perpendicular to the first axis. The first axis is perpendicular to the second axis. The first arrangement direction is parallel to the second arrangement direction. The first arrangement direction is perpendicular to the first axis. The first arrangement direction is perpendicular to the second axis.

According to some embodiments of the present disclosure, the restraining component further includes a fourth restraining element. The fourth restraining element is arranged with the third restraining element along the second arrangement direction. The first restraining element, the second restraining element, the third restraining element and the fourth restraining element are located on the imaginary plane.

BRIEF DESCRIPTION OF THE DRAWINGS

A clear understanding of the present disclosure can be obtained through the subsequent detailed description and accompanying illustrations. It should be emphasized that, according to industry-standard practices, various features are not drawn to scale and are solely for illustrative purposes. In fact, for clarity of explanation, dimensions of various features may be arbitrarily enlarged or reduced.

DETAILED DESCRIPTION OF THE INVENTION

In order to make the purpose, features, and advantages of the present invention more clearly understandable, embodiments are given below and explained in detail along with the accompanying drawings. The configuration of each component in the embodiment is for illustration only and is not intended to limit the present invention. In addition, the partial repetition of numbers in the figures in the embodiments is for simplifying the description and does not imply the correlation between different embodiments. Directional terms mentioned in the following embodiments, such as up, down, left, right, front or back, etc., are only for reference to the directions in the attached drawings. Therefore, the directional terms used are for illustration and not for limitation of the present invention.

In addition, relative terms, such as "lower" or "bottom" and "higher" or "top" may be used in the embodiments to describe the relative relationship of one element to another element in the figures. It is understood that if the illustrated device was turned upside down, elements described as being on the "lower" side would become elements described as being on the "higher" side.

The following describes the optical module according to the embodiment of the present invention. However, it can be readily appreciated that the present invention provides many suitable invention concepts that can be implemented in a wide variety of specific contexts. The specific embodiments disclosed are only used to illustrate the use of the present invention in specific ways, and are not intended to limit the scope of the present invention. Unless otherwise defined, all terms (including technical and scientific terms) used herein have the same meaning as commonly understood by one of ordinary skill in the art to which this invention belongs. It is understood that these terms, such as terms defined in commonly used dictionaries, should be interpreted to have a meaning consistent with the background or context of the relevant technology and the invention, and should not be interpreted in an idealized or overly formal manner, unless otherwise defined herein.

Figure 1A:
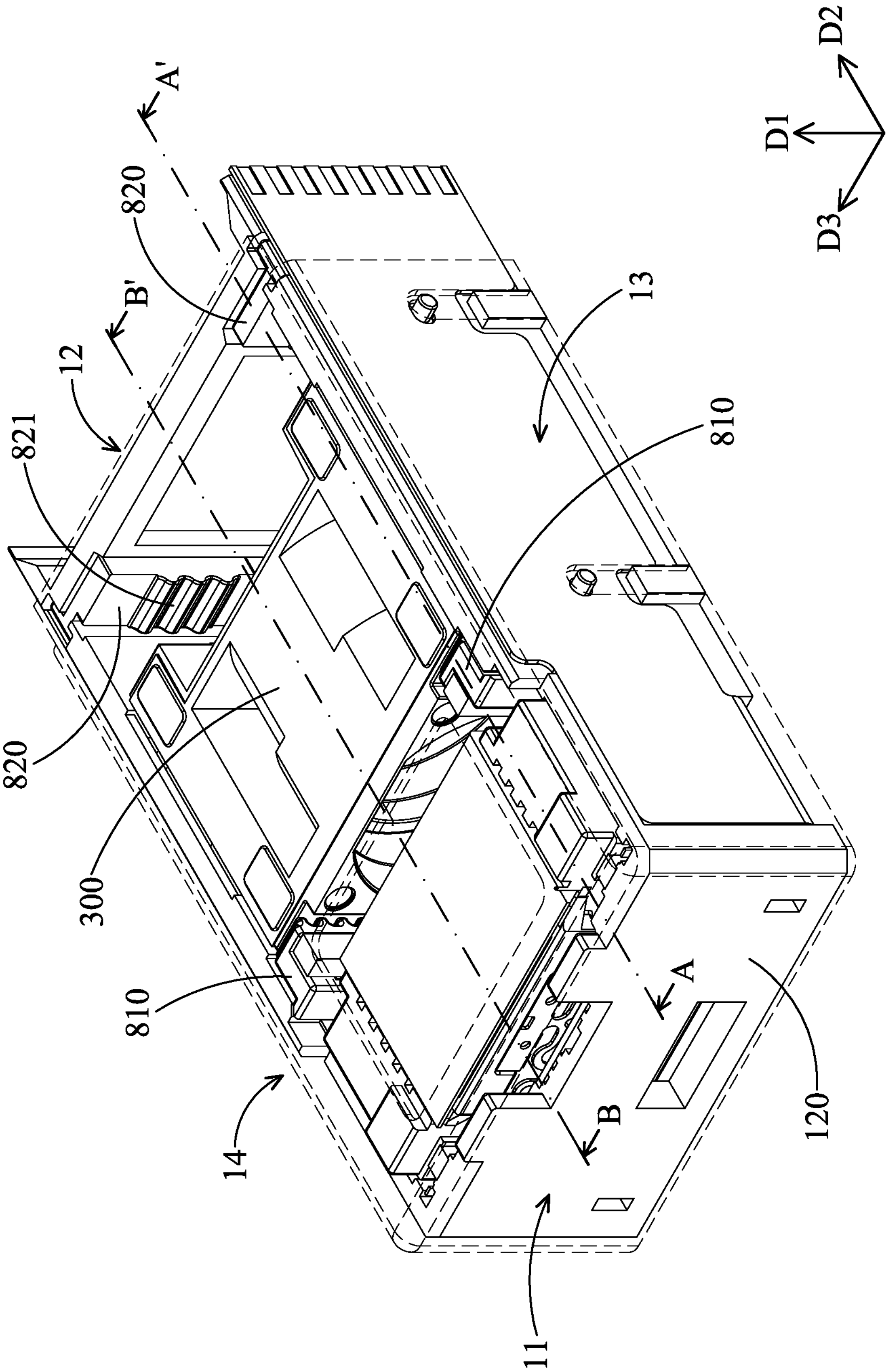
FIG. 1A shows a perspective view of an optical module according to some embodiments of the present disclosure.
Figure 1B:
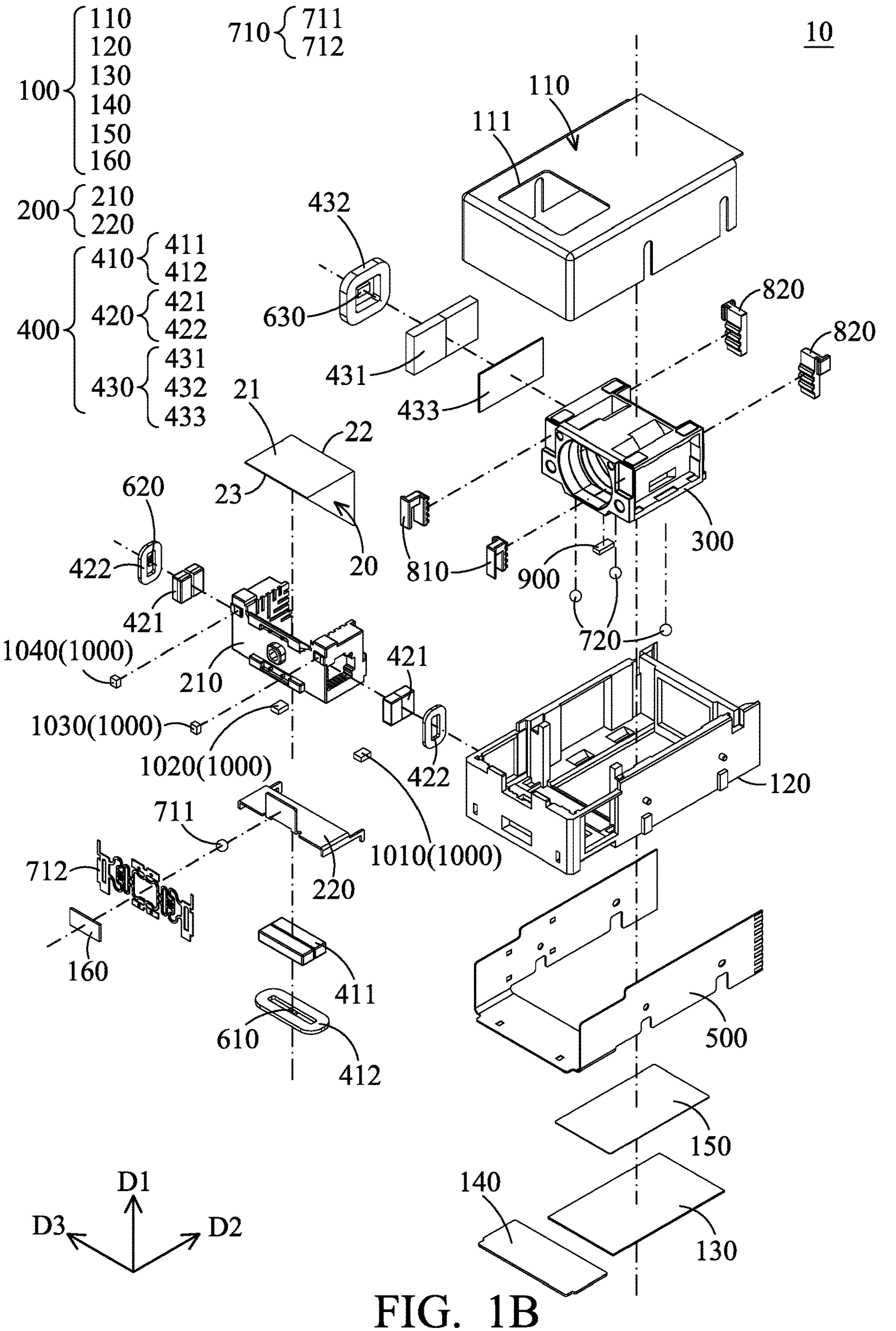
FIG. 1B shows an exploded view of the optical module according to some embodiments of the present disclosure.

FIG. 1A shows a perspective view of an optical module 10 according to some embodiments of the present disclosure. FIG. 1B shows an exploded view of the optical module 10 according to some embodiments of the present disclosure. Please refer to FIG. 1A, the optical module 10 includes a first side 11, a second side 12, a third side 13 and a fourth side 14. The first side 11 and the second side 12 of the optical module 10 are opposite, and the third side 13 and the fourth side 14 are opposite.

Please refer to FIG. 1A and FIG. 1B together. The optical module 10 also includes a fixed portion 100, a movable portion 200, a movable portion 300, a driving component 400, a circuit member 500, a plurality of position sensing elements 610, 620, 630, a support component 710, a support component 720, a plurality of stopper elements 810, 820, a stabilizing magnetic element 900 and a restraining component 1000.

In some embodiments, the fixed portion 100 includes a housing 110, a base 120, a first structural strengthening element 130, a second structural strengthening element 140, a stray light suppression element 150 and a magnetically permeable element 160. For illustrative purposes, the housing 110 is shown in dashed lines in FIG. 1A.

In some embodiments, the housing 110 is fixedly connected to the base 120 to form an accommodating space to accommodate other elements. The housing 110 includes an opening 111, wherein light from the outside enters the optical module 10 through the opening 111.

Figure 2:
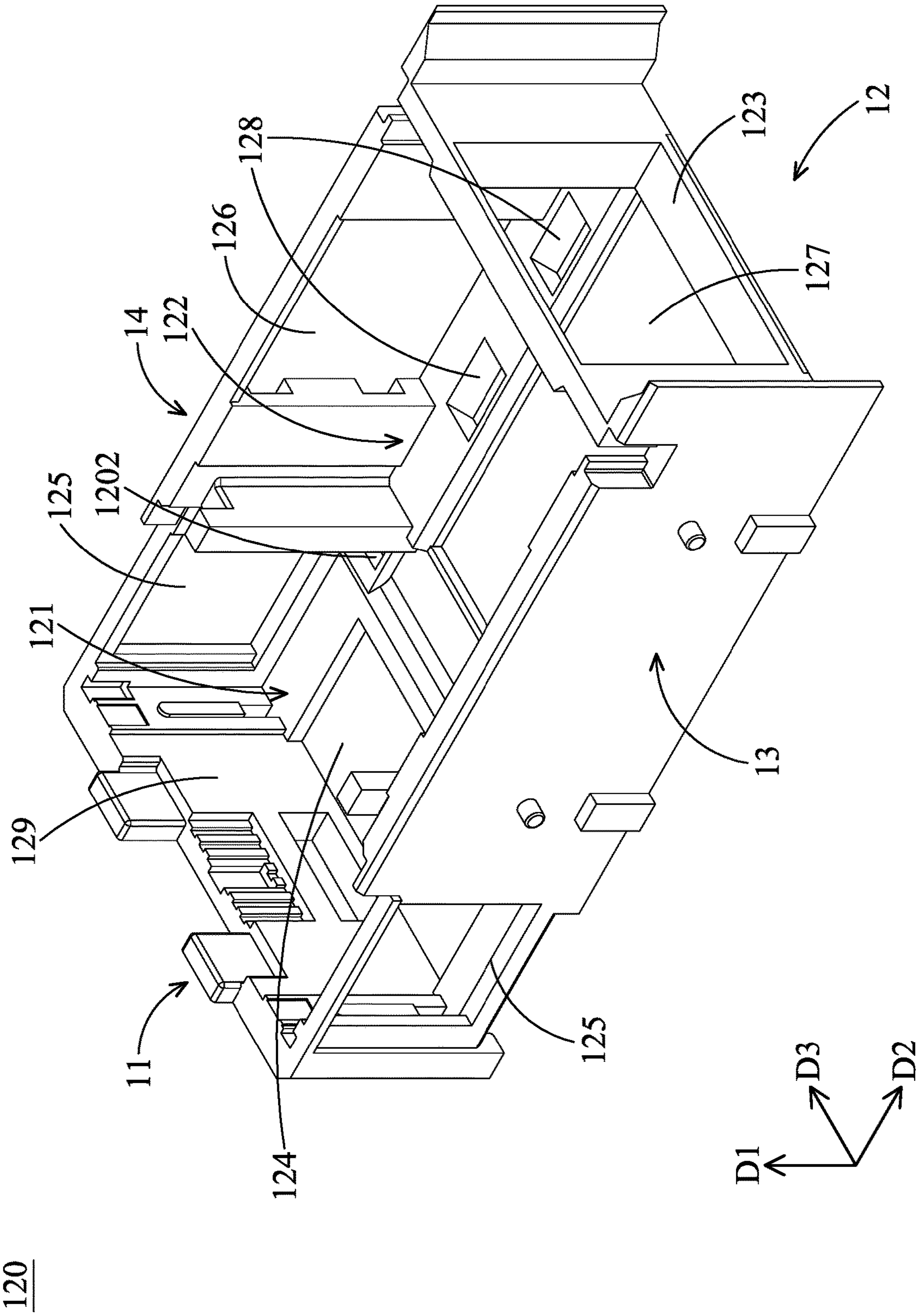
FIG. 2 shows a perspective view of a base according to some embodiments of the present disclosure.

Next, please refer to FIG. 2 for now. As shown in FIG. 2, the base 120 includes a first accommodating space 121, a second accommodating space 122, an opening 123, an opening 124, two openings 125, an opening 126, an opening 127, three grooves 128 and a fixing element 129.

In some embodiments, the movable portion 200 is disposed in the first accommodating space 121 (FIG. 2) of the base 120, and is movable within a range of movement relative to the fixed portion 100. The movable portion 300 is disposed in the second accommodating space 122 of the base 120 (see FIG. 2), and is movable within a range of movement relative to the fixed portion 100.

In some embodiments, the first structural strengthening element 130 is disposed in the opening 127 of the base 120 (FIG. 2). The second structural strengthening element 140 is disposed on the circuit member 500. The first structural strengthening element 130 and the second structural strengthening structure 140 are made of metal material. Specifically, the first structural strengthening element 130 and the second structural strengthening structure 140 can be made of magnetically permeable material. The first structural strengthening element 130 and the second structural strengthening structure 140 may strengthen the structure of the optical module 10.

In some embodiments, the stray light suppression element 150 is over the first structural strengthening element 130 and is disposed together with the first structural strengthening element 130 in the opening 127 of the base 120 (FIG. 2). The stray light suppression element 150 is a coated metal sheet. The stray light suppression element 150 absorbs stray light and scattered light in the optical module 10 to improve optical imaging quality.

In some embodiments, magnetically permeable element 160 is disposed on base 120. The magnetic permeable element 160 may be a steel sheet with high hardness, which is not easily deformed even if it is impacted (for example, impacted by the support element 711 described below).

The movable portion 200 includes a carrier 210 and a reinforcing member 220.

The carrier 210 may be made of plastic material. The carrier 210 connects the optical element 20. The optical element 20 may be, for example, a prism, which has the function of changing the traveling direction of light. For example, the optical element 20 may include a light-incident surface 21, a light-emitting surface 22 and a reflective surface 23. The movable portion 300 may be connected to another optical element (e.g., a image sensor) (not shown).

In the embodiment shown in FIG. 1B, the light-incident surface 21 is the surface through which light passes when entering the optical module 10. The light-incident surface 21 is perpendicular to the first axis D1. The light-emitting surface 22 is the surface through which light passes when leaving the optical module 10. The light-emitting surface 22 is perpendicular to the light-incident surface 21. With the optical characteristics of the optical element 20, the light changes its traveling direction after reaching the reflective surface 23 to obtain the required optical effect.

In some embodiments, light can enter the optical module 10 through the light-incident surface 21 along the optical axis (for example, the direction of the negative first axis D1), and change the traveling direction (for example, from the direction of the negative first axis D1 to the direction of the second axis D2) via the reflective surface 23. Then, light may passes through the light-emitting surface 22 and enters the optical element (not shown) located in the movable portion 300, and finally enters the image sensor (not shown) provided in the opening 123 (FIG. 2) of the base 120. The first axis D1 is perpendicular to the second axis D2.

In some embodiments, the reinforcing member 220 may be made of magnetically permeable material. The reinforcing member 220 is fixedly disposed on the carrier 210. In particular, the reinforcing member 220 may be partially embedded in the carrier 210 by insert molding, the details of which is described in detail later.

In some embodiments, the first driving component 410 may drive the movable portion 200 to perform a first movement relative to the fixed portion 100. The first driving component 410 includes a first magnetic element 411 and a first coil 412. The first magnetic element 411 is fixedly disposed in the carrier 210 and contacts the reinforcing member 220 partially embedded in the carrier 210. The first coil 412 is located in the opening 124 (FIG. 2) of the base 120 and is electrically connected to the circuit member 500. In some embodiments, the aforementioned first movement of the movable portion 200 is a rotational movement of the movable portion 200 with the axis parallel to the first axis D1 serving as the axis of rotation.

The first magnetic element 411 and the first coil 412 correspond to each other. Specifically, when a driving signal is applied to the first driving component 410 (for example, a current is applied by an external power supply), a magnetic force is generated between the first magnetic element 411 and the first coil 412. Thereby, the movable portion 200 is driven to move relative to the fixed portion 100 to achieve the OIS function to obtain the required optical effect.

In some embodiments, the second driving component 420 may drive the movable portion 200 to perform a second movement relative to the fixed portion 100. The second driving component 420 includes two second magnetic elements 421 and two second coils 422. The second magnetic element 421 is disposed on the carrier 210. The two second coils 422 are respectively located at the two openings 125 of the base 120 (FIG. 2), and are electrically connected to the circuit member 500. In some embodiments, the second movement of the movable portion 200 is a rotational movement of the movable portion 200 with the axis parallel to the third axis D3 serving as the axis of rotation.

The second magnetic element 421 and the second coil 422 correspond to each other. Specifically, when a driving signal is applied to the second driving component 420 (for example, a current is applied by an external power supply), a magnetic force is generated between the second magnetic element 421 and the second coil 422. Thereby, the movable portion 200 is driven to move relative to the fixed portion 100 to achieve the OIS function to obtain the required optical effect.

In some embodiments, the third driving component 430 may drive the movable portion 300 to perform a third movement relative to the fixed portion 100. The third driving component 430 is disposed on the fourth side 14 of the optical module 10 (FIG. 1A). In detail, the third driving component 430 includes a third magnetic element 431, a third coil 432 and a magnetically permeable element 433.

The third magnetic element 431 is disposed on the movable portion 300. The third coil 432 is located in the opening 126 of the base 120 (FIG. 2) and is electrically connected to the circuit member 500. In some embodiments, the third movement of the movable portion 300 is the movement of the movable portion 300 in the direction of the second axis D2.

The third magnetic element 431 and the third coil 432 correspond to each other. Specifically, when a driving signal is applied to the third driving component 430 (for example, a current is applied by an external power supply), a magnetic force is generated between the third magnetic element 431 and the third coil 432. Thereby, the movable portion 300 is driven to move relative to the fixed portion 100 to achieve the autofocus function to obtain the required optical effect.

The magnetically permeable element 433 is disposed on the movable portion 300. Specifically, the magnetically permeable element 433 is disposed between the movable portion 300 and the third magnetic element 431, which may concentrate the magnetic force of the third magnetic element 431 in a predetermined direction. This enhances the magnetic thrust exerted by the third driving component 430 to move the movable portion 300 and reduces the effect of magnetic interference. Furthermore, it also enhances the overall mechanical strength of the movable portion 300.

In some embodiments, the circuit member 500 is configured to electrically connecting the driving component 400 and the position sensing elements 610, 620, and 630. The circuit member 500 is fixedly connected to the base 120. In some embodiments, the position sensing element 610 and the first coil 412 are located together in the opening 124 of the base 120 (FIG. 2) and are electrically connected to the circuit member 500.

The position sensing element 620 and the second coil 422 are located together in the opening 125 of the base 120 (FIG. 2) and are electrically connected to the circuit member 500. The position sensing element 630 and the third coil 432 are located together in the opening 126 of the base 120 (FIG. 2) and are electrically connected to the circuit member 500.

The position sensing elements 610 and 620 are configured to sense the relative position relationship between the movable portion 200 and the base 120, so that a control unit (not shown) may adjust the position between the two through the driving component 400. The position sensing element 630 is configured to sense the relative position relationship between the movable portion 300 and the base 120, so that a control unit (not shown) may adjust the position between the two through the driving component 400.

It is noted that the position sensing elements 610, 620, and 630 are respectively disposed in the hollow portions of the first coil 412, the second coil 422, and the third coil 432. In other words, the position sensing elements 610, 620, and 630 are respectively surrounded by the hollow portions of the first coil 412, the second coil 422, and the third coil 432. This configuration can make full use of space and reduce the size of the entire driving mechanism.

In some embodiments, the position sensing element 610 may also correspond to the first magnetic element 411 as same as the first coil 412. The position sensing element 620 may also correspond to the second magnetic element 421 as same as the second coil 422. The position sensing element 630 may also correspond to the third magnetic element 431 as same as the third coil 432.

In some embodiments, the support component 710 includes a support element 711 and an elastic element 712. The support element 711 may be a spherical object. The support element 711 may be made of metal material. The support element 711 is disposed between the movable portion 200 and the fixed portion 100 to provide support as the movable portion 200 moves relative to the fixed portion 100. The movable portion 200 is capable of rotating relative to the fixed portion 100 about the support element 711 as a pivot point (e.g., for the aforementioned first and second movements). The elastic element 712 is disposed on the carrier 210. The movable portion 200 is elastically connected to the fixed portion 100 via the elastic element 712.

In some embodiments, three support components 720 are respectively disposed in three grooves 128 of the base 120 (FIG. 2). The support component 720 may be a spherical object to assist the movement of the movable portion 300 relative to the fixed portion 100 in the direction of the second axis D2.

In some embodiments, two stopper elements 810 and two stopper elements 820 are disposed within the base 120 (as can be seen more clearly in FIG. 1A). When the movable portion 300 moves to the first limiting position shown in FIG. 1A, the movable portion 300 contacts the two stopper elements 810. Similarly, the movable portion 300 contacts the two stopper elements 820 when the movable portion 300 moves to the second limiting position close to the second side 12 (FIG. 1A).

The stopper element 810 and the stopper element 820 may be made of rubber or other similar materials. The stopper element 810 and the stopper element 820 may buffer and absorb the impact force when the movable portion 300 moves to the first limit position and the second limit position, and may also reduce the noise generated when the movable portion 300 moves.

The stopper element 810 and the stopper element 820 may have a wavy structure (e.g., the wavy structure 821 of the stopper element 820 shown in FIG. 1A). Due to the wavy structure 821 reducing the contact area upon collision, when the movable portion 300 impacts the stopper element 810 or the stopper element 820, the impact force is distributed to the surrounding area by the wavy structure 821. Consequently, it can absorb a larger amount of impact force, thereby achieving a better buffering effect.

In some embodiments, the stabilizing magnetic element 900 is disposed on the movable portion 300. The stabilizing magnetic element 900 corresponds to the first structural strengthening element 130 of the fixed portion 100. Specifically, in order to reduce magnetic interference, the third driving component 430 is disposed on the fourth side 14 of the optical module 10 (FIG. 1A), and since the thrust force for driving the movable portion 300 is on one side (the aforementioned fourth side 14), the movable portion 300 may flip over when being driven. Therefore, by utilizing the magnetic attraction force between the stabilizing magnetic element 900 and the first structural strengthening element 130, providing the movable portion 300 with a magnetic pull towards the negative first axis D1 direction, it prevents the aforementioned flipping scenario and ensures smoother movement of the movable portion 300.

In some embodiments, the restraining component 1000 includes a first restraining element 1010, a second restraining element 1020, a third restraining element 1030, a fourth restraining element 1040, a first containing structure (i.e., a first containing structure 1201 as will be described later), a second containing structure (i.e., a second containing structure 1202 as will be described later), a reinforcing member (i.e., a reinforcing member 220 as will be described later), a pair of first setting portion (i.e., a first setting portion 215 as will be described later) and a pair of second setting portions (i.e., a second setting portion 1295 as will be described later).

In some embodiments, the first restraining element 1010, the second restraining element 1020, the third restraining element 1030 and the fourth restraining element 1040 are made of plastic material (for example, resin). In some embodiments of the present disclosure, the first restraining element 1010, the second restraining element 1020, the third restraining element 1030, and the fourth restraining element 1040 are cured gel.

The first restraining element 1010, the second restraining element 1020, the third restraining element 1030 and the fourth restraining element 1040 directly contact the movable portion 200 and the fixed portion 100 to restrain abnormal movement of the movable portion relative to the fixed portion.

FIG. 2 shows a perspective view of the base 120 according to some embodiments of the present disclosure. In FIG. 2, a first accommodating space 121 for accommodating the movable portion 200 (FIG. 1B) and a second accommodating space 122 for accommodating the movable portion 300 (FIG. 1B) can be seen.

The opening 123 of the base 120 is located on the second side 12 of the optical module 10. The opening 123 may accommodate an image sensor (not shown). The opening 124 of the base 120 is located on the bottom side of the optical module 10. The opening 124 accommodates the first coil 412. The two openings 125 of the base 120 are respectively located on the third side 13 and the fourth side 14 of the optical module 10. The opening 125 accommodates the second coil 422.

The opening 126 of the base 120 is located on the fourth side 14 of the optical module 10. The opening 126 accommodates the third coil 432. The opening 127 of the base 120 is on the bottom side of the optical module 10. The opening 127 accommodates the first structural strengthening element 130 and the stray light suppression element 150. Two grooves 128 for receiving the support component 720 therein adjacent the fourth side 14 can be seen in the view of FIG. 2.

It should be understood that there is also a groove 128 adjacent the third side 13 that is obscured in the view of FIG. 2 for receiving a support component 720. The fixing element 129 of the base 120 is a sidewall close to the first side 11, and the details of the fixing element 129 are described further with reference to FIG. 4.

Figure 3:
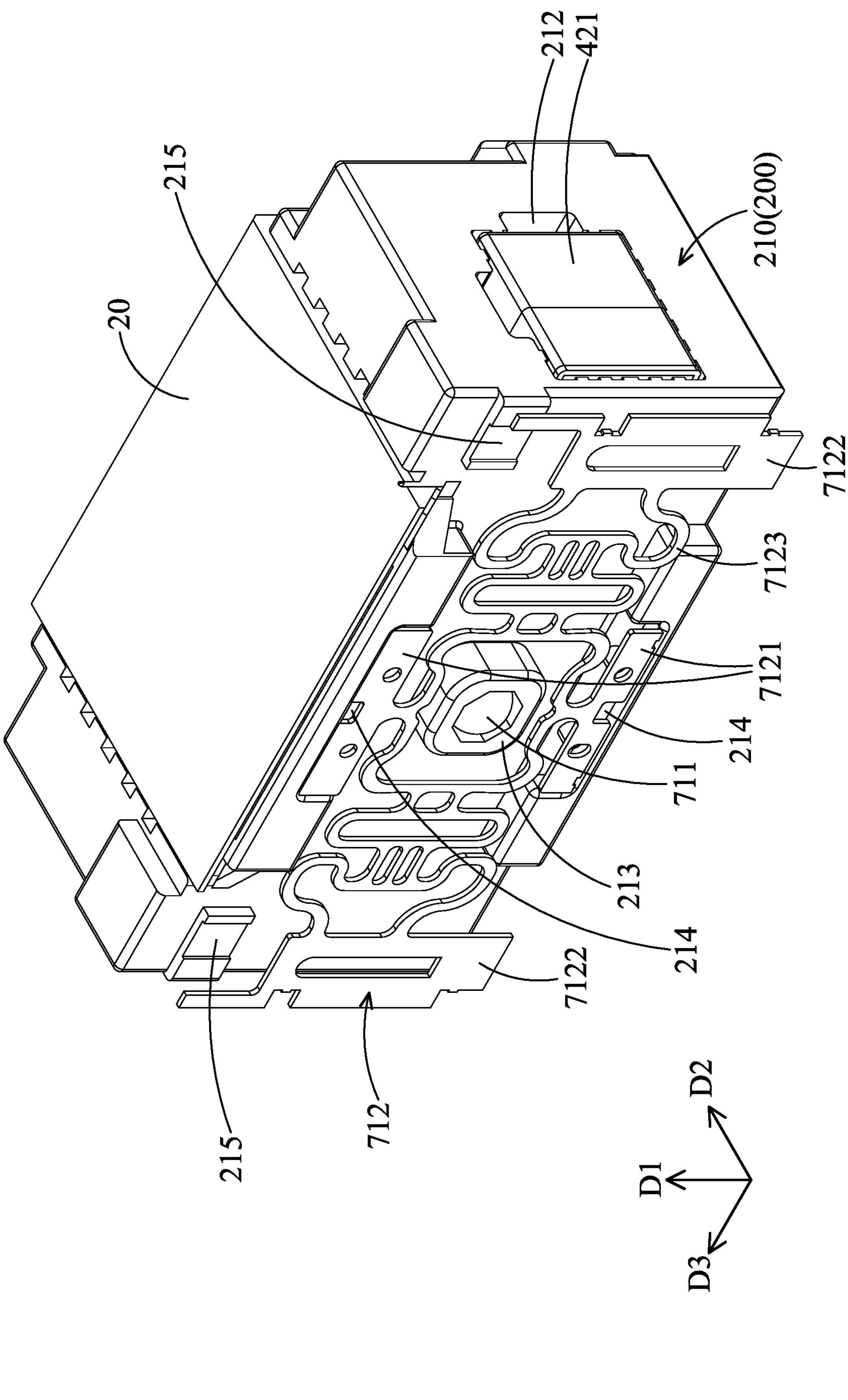
FIG. 3 shows a perspective view of part of the optical module according to some embodiments of the present disclosure.

FIG. 3 shows a perspective view of part of the optical module 10 according to some embodiments of the present disclosure. As shown in FIG. 3, the carrier 210 includes an accommodating space 211 (FIG. 6C), a pair of accommodating spaces 212, a receiving space 213, a pair of connecting parts 214 and a pair of first setting portions 215.

The accommodating spaces 212 of the carrier 210 are located on opposite sides of the carrier 210, and the accommodating spaces 212 accommodate the second magnetic elements 421. The receiving space 213 of the carrier 210 receives the support element 711. The connecting part 214 of the carrier 210 is connected to the elastic element 712.

In some embodiments of the present disclosure, the first setting portion 215 of the carrier 210 functions as the first setting portion of the restraining component 1000. The third restraining element 1030 (FIG. 1B) and the fourth restraining element 1040 (FIG. 1B) are disposed on the first setting portion 215 of the carrier 210. It should be understood that in other embodiments, the first setting portion of the restraining component 1000 may also be disposed on other components of the optical module 10.

As shown in FIG. 3, the elastic element 712 includes a pair of movable portion fixed ends 7121, a pair of fixed portion fixed ends 7122 and an elastic portion 7123. The movable portion fixed ends 7121 are fixedly connected to the connecting part 214 of the carrier 210 of the movable portion 200. The fixed portion fixed end 7122 is fixedly connected to the fixing element 129 of the base 120 of the fixed portion 100 (FIG. 2).

The elastic portion 7123 has a flexible structure. The movable portion fixed end 7121 is movable relative to the fixed portion fixed end 7122 via the elastic portion 7123. The elastic element 712 and the fixing element 129 (FIG. 2) both have plate-like structures. The thickness direction of the elastic element 712 and the thickness direction of the fixing element 129 (FIG. 2) (i.e., in the direction of the second axis D2) are parallel to each other.

Figure 4:
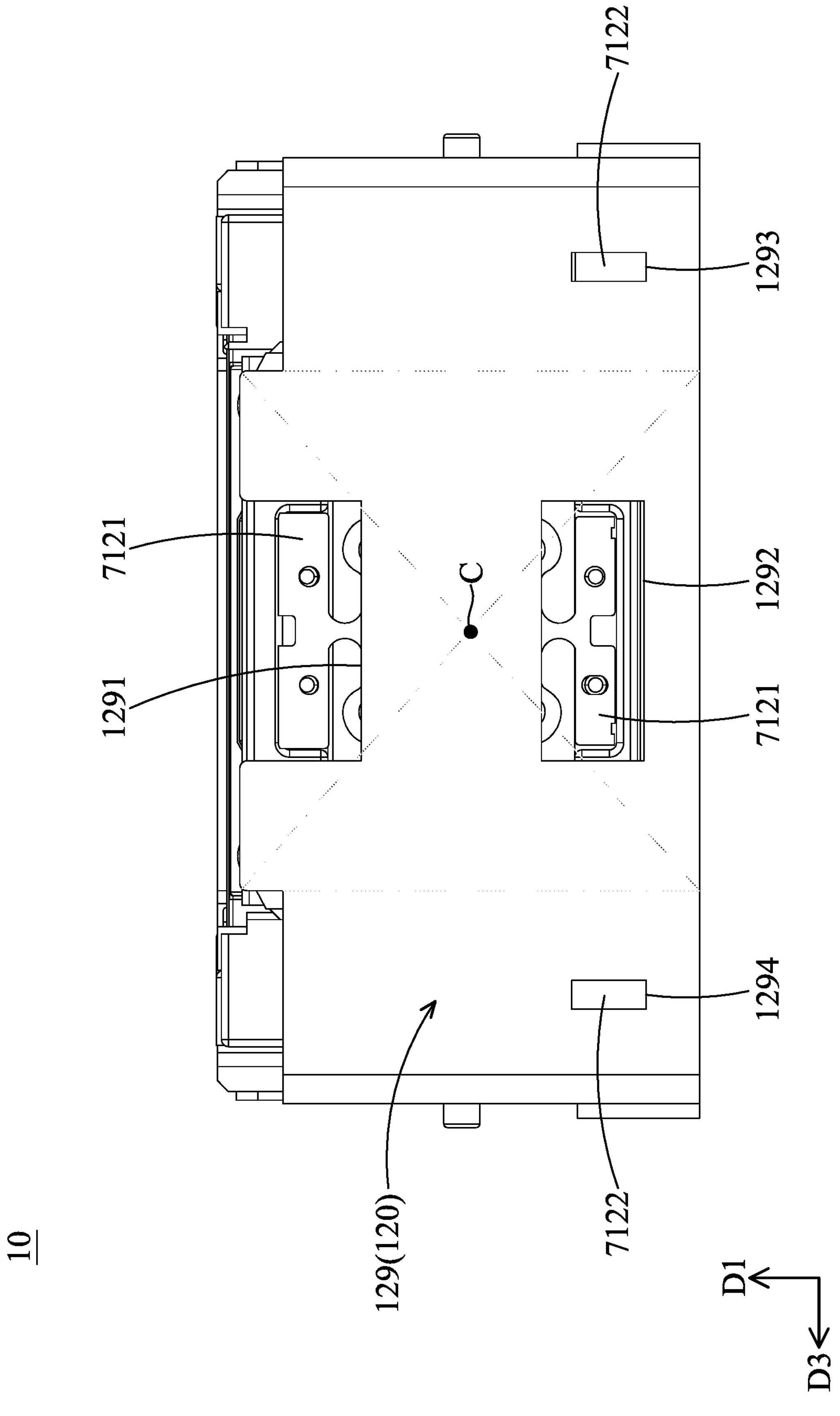
FIG. 4 shows a side view of the optical module according to some embodiments of the present disclosure, with the housing not shown for illustrative purposes.
Figure 7:
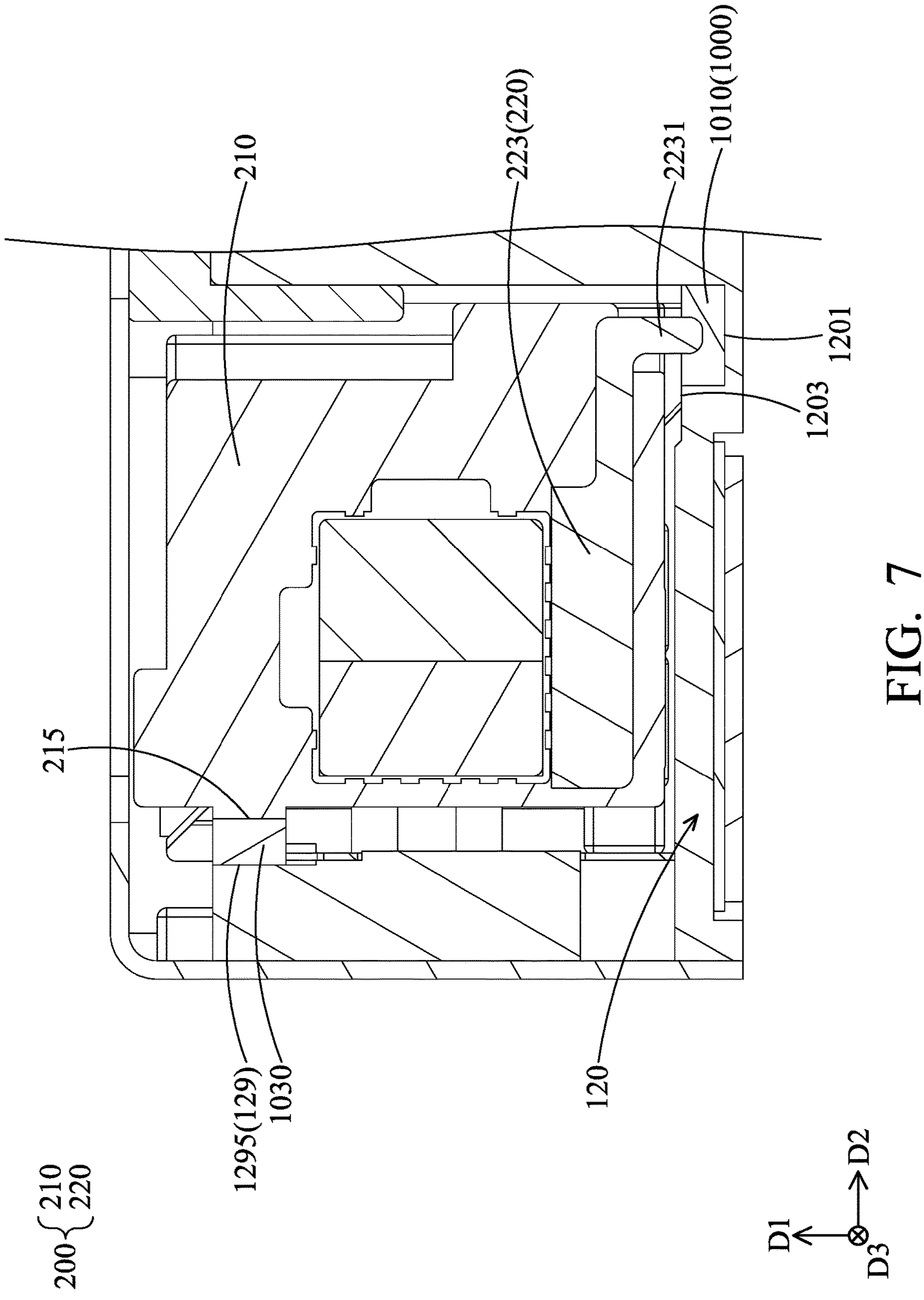
FIG. 7 shows a partial cross-sectional view of the optical module taken along line A-A' of FIG. 1A.

FIG. 4 shows a side view of the optical module 10 according to some embodiments of the present disclosure, in which the housing 110 is not shown for illustration purposes. The fixing element 129 of the base 120 can be seen in FIG. 4. The fixing element 129 includes a first opening 1291, a second opening 1292, a third opening 1293, a fourth opening 1294 and a pair of second setting portions (FIG. 7).

When viewed along the thickness direction of the fixing element 129, the movable portion fixed end 7121 is at least partially exposed from the first opening 1291. When viewed along the thickness direction of the fixing element 129, the movable portion fixed end 7121 is at least partially exposed from the second opening 1292. When viewed along the thickness direction of the fixing element 129, the fixed portion fixed end 7122 is at least partially exposed from the third opening 1293. When viewed along the thickness direction of the fixing element 129, the fixed portion fixed end 7122 is at least partially exposed from the fourth opening 1294.

The arrangement direction of the first opening 1291 and the second opening 1292 (for example, from the center of the first opening 1291 to the center of the second opening 1292) and the arrangement direction of the third opening 1293 and the fourth opening 1294 (for example, from the center of the third opening 1293 to the center of the fourth opening 1294) are different. Specifically, the arrangement direction of the first opening 1291 and the second opening 1292 is parallel to the direction of the negative first axis D1. The arrangement direction of the third opening 1293 and the fourth opening 1294 is parallel to the direction of the third axis D3.

When viewed along the thickness direction of the fixing element 129, the line connecting the third opening 1293 and the fourth opening 1294 (for example, from the center of the third opening 1293 to the center of the fourth opening 1294) does not pass through the center C of the fixing element 129. When viewed along the thickness direction of the fixing element 129, the line connecting the third opening 1293 and the fourth opening 1294 (for example, from the center of the third opening 1293 to the center of the fourth opening 1294) partially overlap with the second opening 1292.

As shown in FIG. 4, the first opening 1291 is open and the second opening 1292 is closed, but the present invention is not limited thereto. In some embodiments, the first opening 1291 may also be closed. If the upper edge of the fixing element 129 is regarded as the boundary of the open end of the first opening 1291, the area of the first opening 1291 is larger than the area of the second opening 1292.

Figure 5:
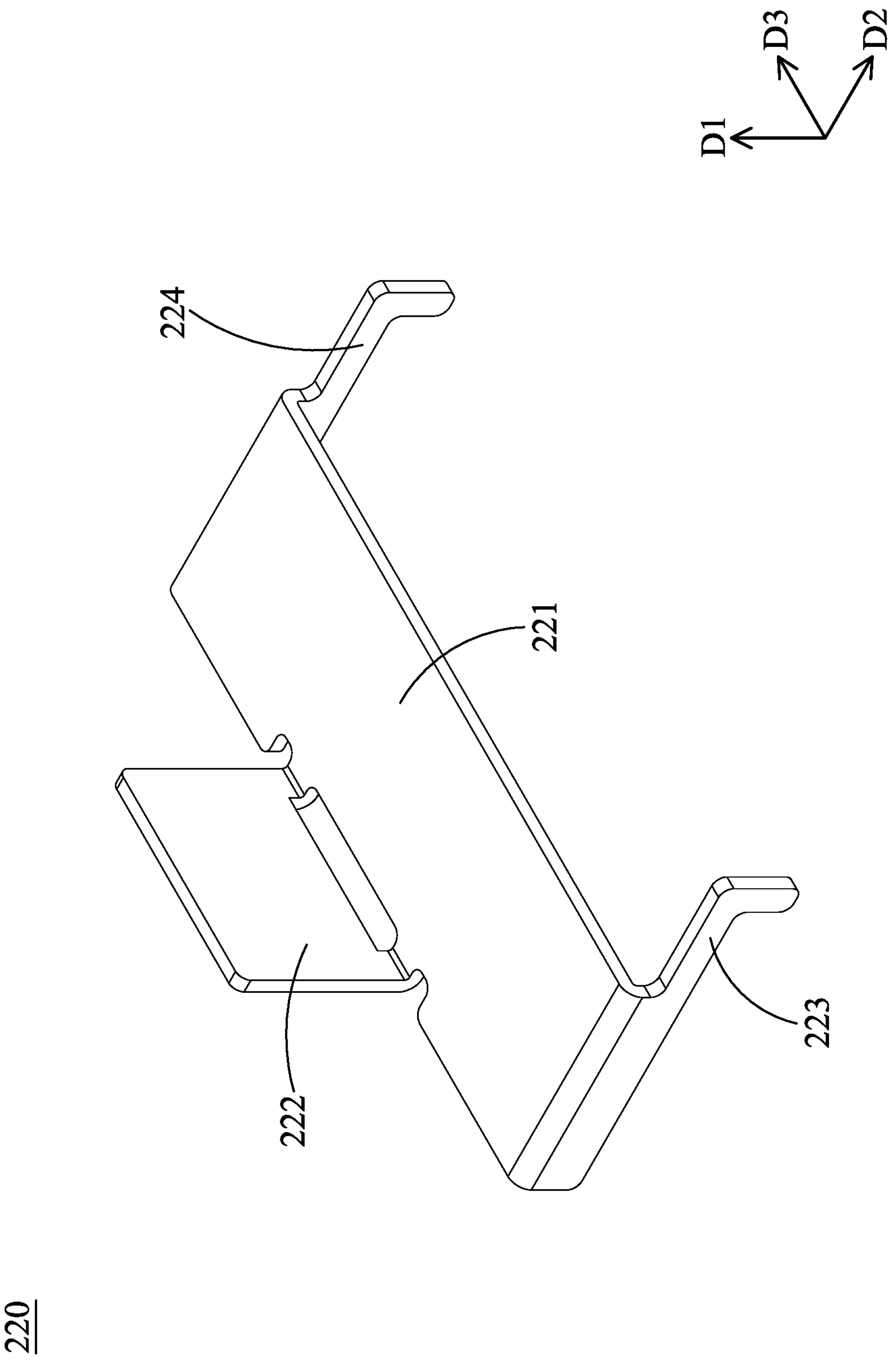
FIG. 5 shows a perspective view of a reinforcing member according to some embodiments of the present disclosure.

FIG. 5 shows a perspective view of the reinforcing member 220 according to some embodiments of the present disclosure. The reinforcing member 220 is made of magnetically permeable material. The reinforcing member 220 includes a first reinforcing element 221, a second reinforcing element 222, a first linking structure 223 and a second linking structure 224.

As shown in FIG. 5, the first reinforcing element 221 and the second reinforcing element 222 have plate-like structures. The first reinforcing element 221 and the second reinforcing element 222 are planes perpendicular to each other. The first reinforcing element 221, the second reinforcing element 222, the first linking structure 223 and the second linking structure 224 have an integrally formed structure.

Figure 6A:
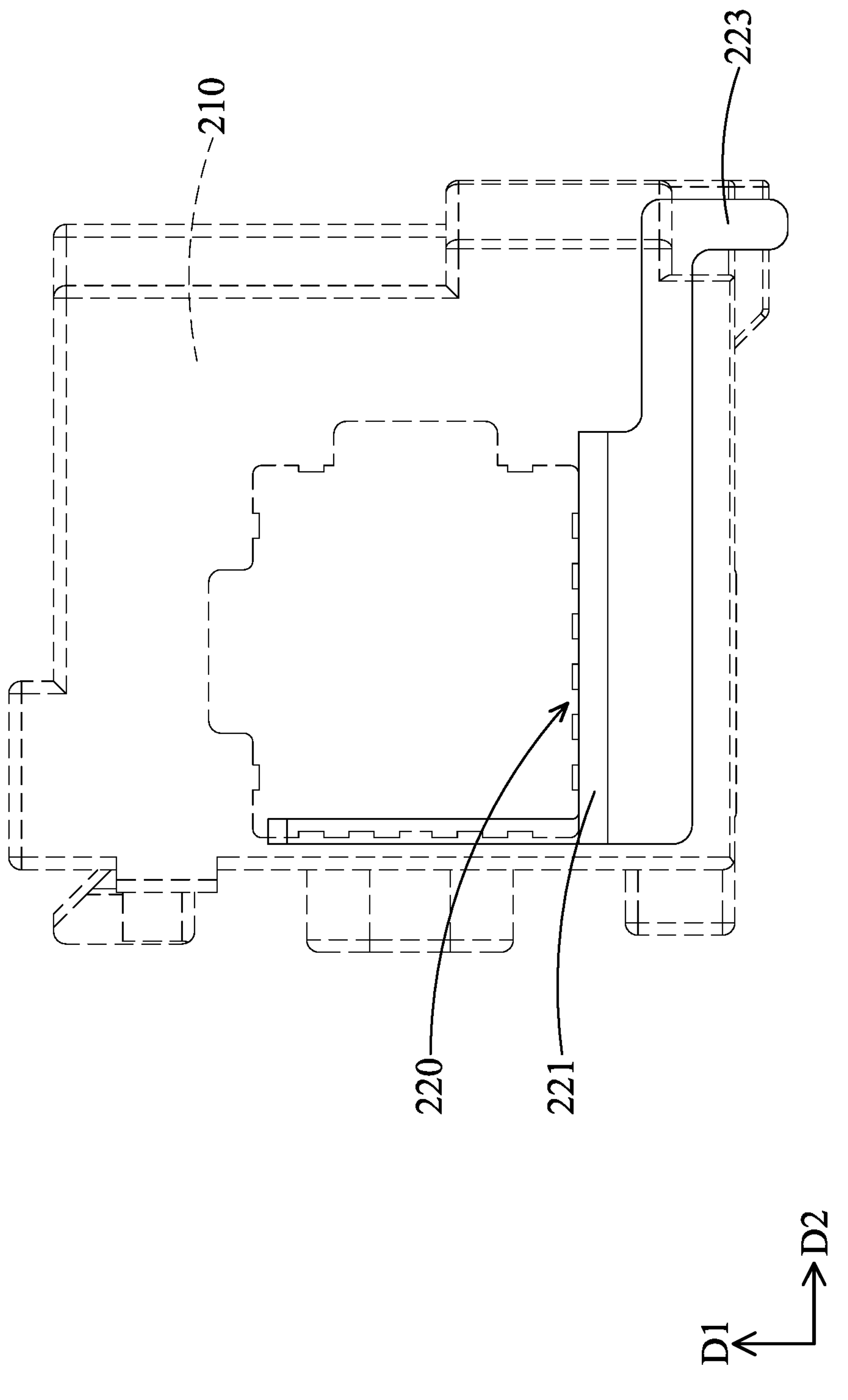
FIG. 6A shows a side view of a carrier and the reinforcing member according to some embodiments of the present disclosure, in which the carrier is shown in dash line for illustrative purposes.
Figure 6B:
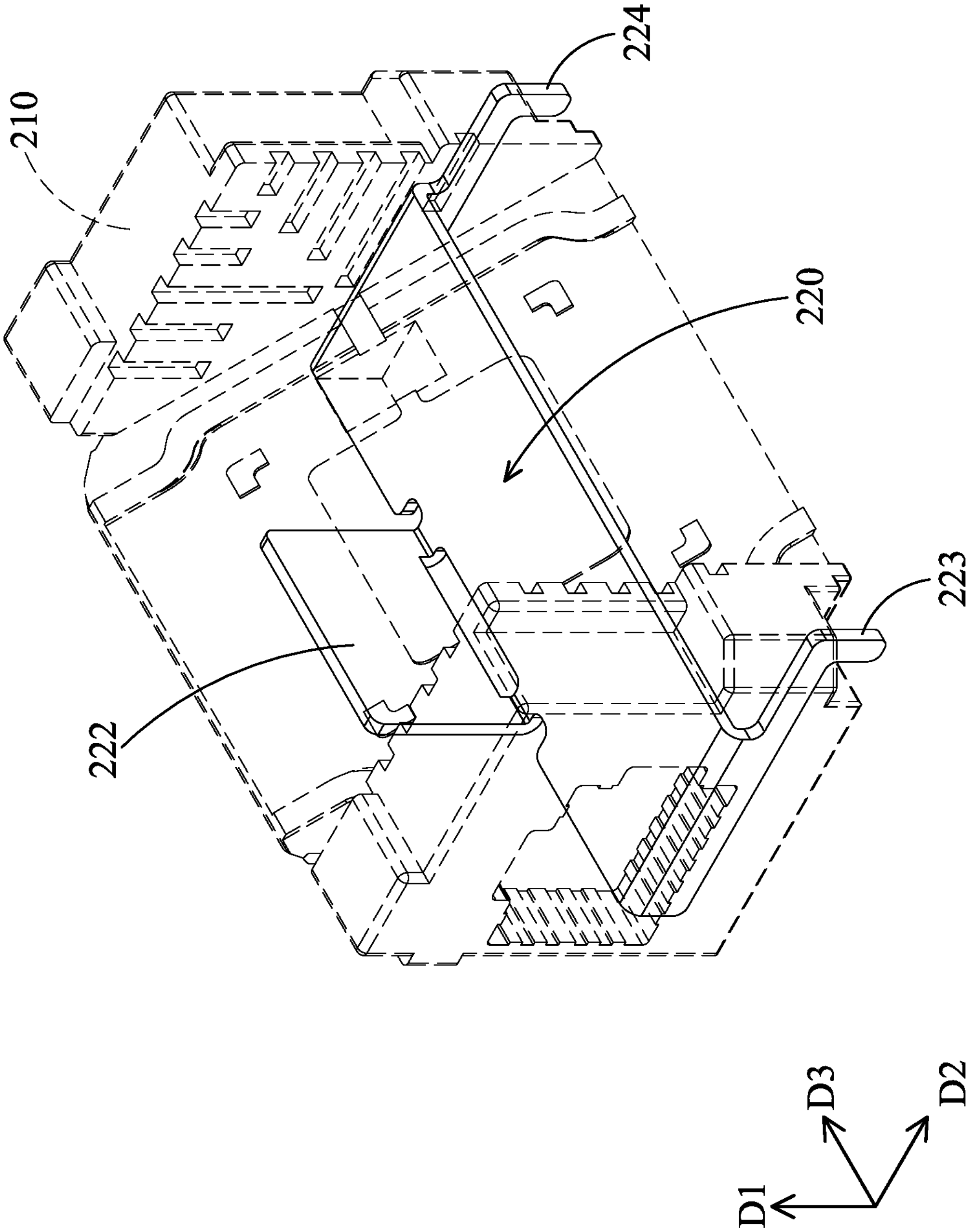
FIG. 6B shows a side view of the carrier and the reinforcing member according to some embodiments of the present disclosure, in which the carrier is shown in dash line for illustrative purposes.

As shown in FIG. 5, the first reinforcing element 221 is located between the first linking structure 223 and the second linking structure 224. The first linking structure 223 and the second linking structure 224 are located on both sides of the first reinforcing element 221. The first linking structure 223 and the second linking structure 224 are at least partially embedded in the carrier 210 (FIGS. 6A and 6B). The first linking structure 223 and the second linking structure 224 are parallel to each other and have the same shape.

FIG. 6A shows a side view of the carrier 210 and the reinforcing member 220 according to some embodiments of the present disclosure, in which the carrier 210 is shown in dash line for illustration purposes. FIG. 6B shows a side view of the carrier 210 and the reinforcing member 220 according to some embodiments of the present disclosure, in which the carrier 210 is shown in dash line for illustration purposes.

Figure 6C:
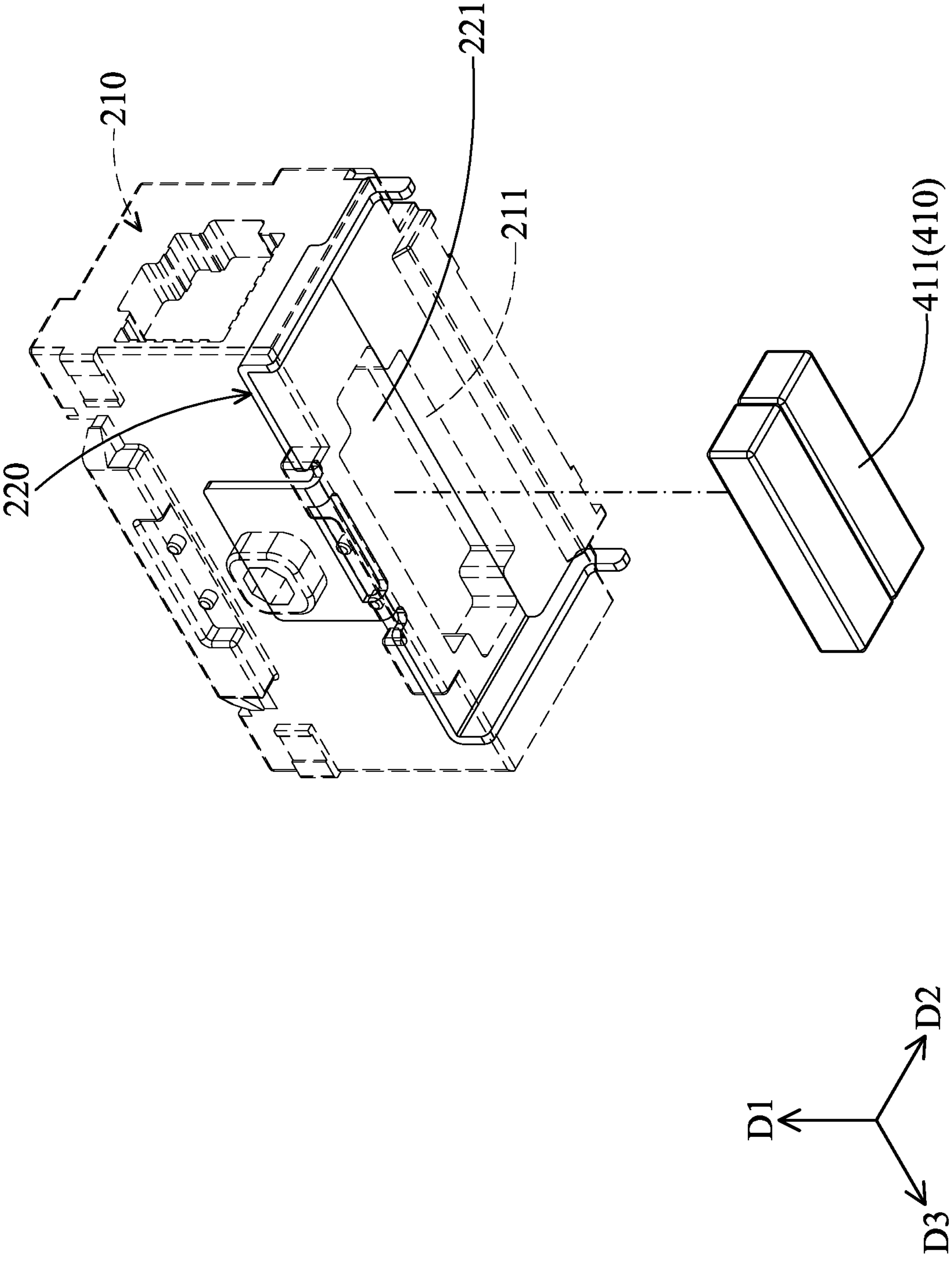
FIG. 6C shows a side view of the carrier, the reinforcing member and the first magnetic element according to some embodiments of the present disclosure, in which the carrier is shown in dash line for illustrative purposes.

As shown in FIGS. 6A and 6B, the reinforcing member 220 is fixedly disposed on the carrier 210. The reinforcing member 220 is at least partially embedded in the carrier 210. FIG. 6C shows a side view of the carrier 210, the reinforcing member 220 and the first magnetic element 411 according to some embodiments of the present disclosure, in which the carrier 210 is shown in dash line for illustration purposes.

As shown in FIG. 6C, the accommodating space 211 of the carrier 210 accommodates the first magnetic element 411. The first reinforcing element 221 of the reinforcing member 220 corresponds to the first magnetic element 411 of the first driving component 410. In other words, the first magnetic element 411 may directly contact the first reinforcing element 221 embedded in the carrier 210 in the accommodating space 211.

FIG. 7 shows a partial cross-sectional view of the optical module 10 taken along line A-A' of FIG. 1A. As shown in FIG. 7, the base 120 further includes a first containing structure 1201, a second containing structure 1202 (FIG. 2) and a surface 1203.

The first containing structure 1201 and the second containing structure 1202 are recessed structures respectively recessed along a recessed direction from the surface 1203 on both sides of the base 120. The recessed direction is parallel to the direction of the negative first axis D1. The first restraining element 1010 of the restraining component 1000 is at least partially located in the first containing structure 1201.

The first linking structure 223 of the reinforcing member 220 includes an end portion 2231. The end portion 2231 of the first linking structure 223 has an long strip structure and extends in a direction parallel to the recessed direction. The end portion 2231 of the first linking structure 223 is at least partially located in the first containing structure 1201 and directly contacts the first restraining element 1010. The material of the first linking structure 223 and the material of the surface 1203 of the base 120 are different. In detail, the first linking structure 223 may be made of metal. The base 120 may be made of plastic.

When viewed along a direction perpendicular to the recessed direction (e.g., the third axis D3), the end portion 2231 of the first linking structure 223 at least partially overlaps with the first containing structure 1201. In detail, the length of the end portion 2231 of the first linking structure 223 extending into the first restraining element 1010 is at least more than 0.05 mm. When the movable portion 200 is located at any position within the range of motion, the end portion 2231 of the first linking structure 223 does not directly contact the first containing structure 1201.

Although the cross-sectional view in FIG. 7 only shows the first linking structure 223, the first restraining element 1010 and the first containing structure 1201, it should be understood that the second restraining element 1020 is also located in the second containing structure 1202 of the base 120 (FIG. 2) in a similar manner, and the second linking structure 224 also similarly has an end portion that directly contacts the second restraining element 1020. Therefore, when the optical module 10 is impacted or shaken, due to the structural design of the first linking structure 223, the first restraining element 1010, the second linking structure 224 and the second restraining element 1020, abnormal movement of the movable portion 200 can be effectively restrained, thereby improving the focus accuracy and image quality of the optical module 10.

In some embodiments of the present disclosure, the first setting portion of the restraining component 1000 is the first setting portion 215 of the carrier 210 shown in FIG. 7. The second setting portion of the restraining component 1000 is the second setting portion 1295 of the fixing element 129 of the base 120 shown in FIG. 7. The first setting portion 215 and the second setting portion 1295 are both surfaces extending on the plane formed by the first axis D1 and the third axis D3, but they do not overlap in their extending direction. That is to say, when viewed in the direction of the first axis D1 or the third axis D3, the first setting portion 215 and the second setting portion 1295 do not overlap.

As shown in FIG. 7, the second setting portion 1295, the third restraining element 1030 and the first setting portion 215 are sequentially arranged in the direction of the second axis D2, and the first setting portion 215 and the second setting portion 1295 do not overlap in this arrangement direction.

The third restraining element 1030 is disposed on the first setting portion 215 and the second setting portion 1295. Although not shown in the cross-sectional view of FIG. 7, it should be understood that the fourth restraining element 1040 is also disposed on the other pair of first setting portions 215 and second setting portions 1295 in the same manner. Therefore, when the optical module 10 is impacted or shaken, due to the structural design of the first setting portion 215, the second setting portion 1295, the third restraining element 1030 and the fourth restraining element 1040, abnormal movement of the movable portion 200 can be effectively restrained, thereby improving the focus accuracy and image quality of the optical module 10.

Figure 8:
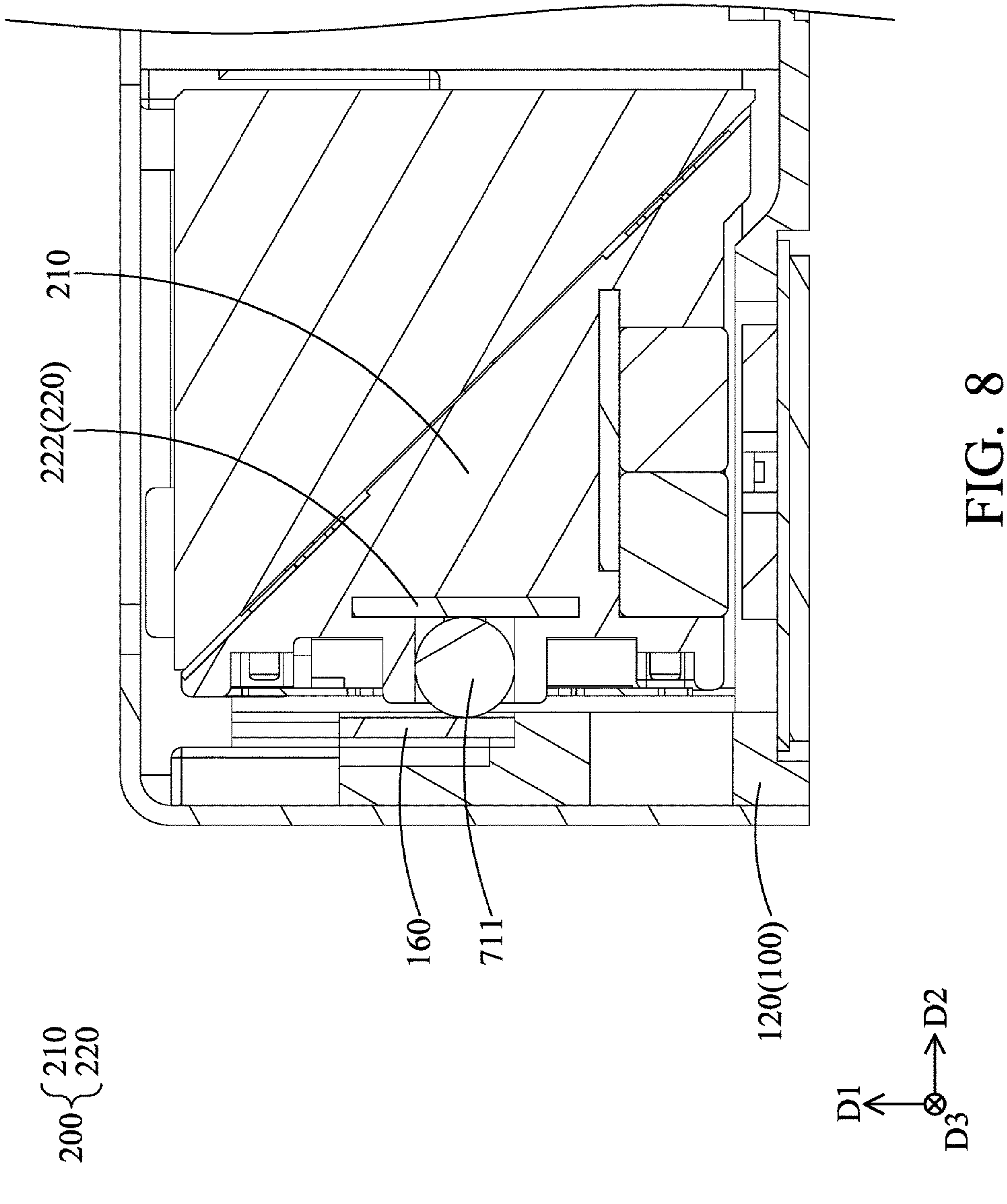
FIG. 8 shows a partial cross-sectional view of the optical module taken along line B-B' of FIG. 1A.

FIG. 8 shows a partial cross-sectional view of the optical module 10 taken along line B-B' of FIG. 1A. As shown in FIG. 8, the movable portion 200 is movable relative to the fixed portion 100 via the support element 711. The support element 711 corresponds to the second reinforcing element 222. In detail, the support element 711 is fixedly connected to the second reinforcing element 222. The second reinforcing element 222 is fixedly disposed on the carrier 210, and the second reinforcing element 222 is at least partially embedded in the carrier 210.

Figure 9:
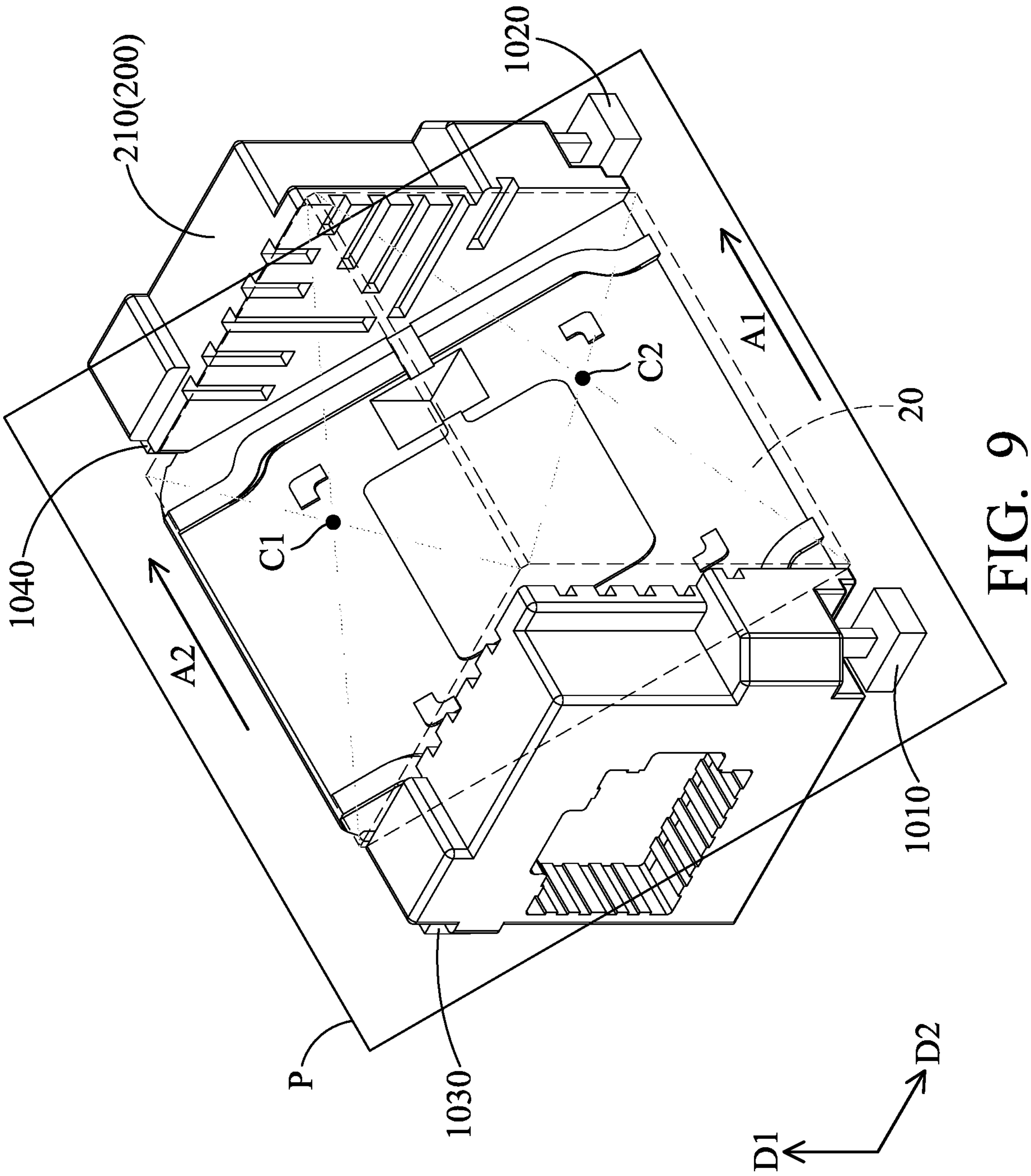
FIG. 9 shows a perspective view of a first restraining element, a second restraining element, a third restraining element, a fourth restraining element and a movable portion carrying the optical element according to some embodiments of the present disclosure, wherein the optical element is shown in dashed line for illustrative purposes.

FIG. 9 shows a perspective view of the first restraining element 1010, the second restraining element 1020, the third restraining element 1030, the fourth restraining element 1040 and the movable portion 200 carrying the optical element 20 according to some embodiments of the present disclosure, wherein for illustrative purposes, the optical element 20 is shown in dashed lines.

As shown in FIG. 9, the first restraining element 1010 and the second restraining element 1020 are arranged along a first arrangement direction A1. The third restraining element 1030 and the fourth restraining element 1040 are arranged along a second arrangement direction A2. The first arrangement direction A1 is parallel to the second arrangement direction A2. The first arrangement direction A1 is perpendicular to the first axis D1, and the first arrangement direction A1 is perpendicular to the second axis D2.

When viewed along the first axis D1, the first arrangement direction A1 and the second arrangement direction A2 are located on opposite sides of the center C1 of the optical element 20. When viewed along the second axis D2, the first arrangement direction A1 and the second arrangement direction A2 are located on opposite sides of the center C2 of the optical element 20.

As shown in FIG. 9, the first restraining element 1010, the second restraining element 1020, the third restraining element 1030 and the fourth restraining element 1040 are located on an imaginary plane P. The imaginary plane P is not parallel to the first axis D1, and the imaginary plane P is not perpendicular to the first axis D1.

Figure 10A:
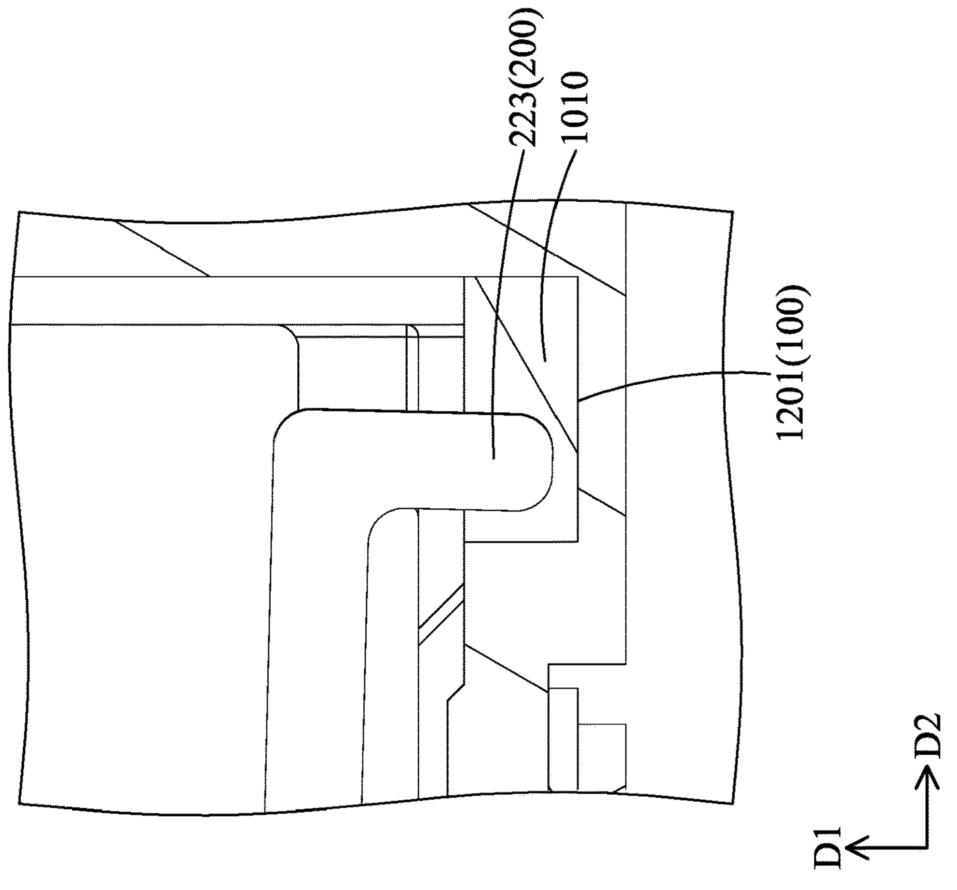
FIGS. 10A and 10B show partial cross-sectional views of the movable portion at different positions relative to the fixed portion within a range of motion.
Figure 10B:
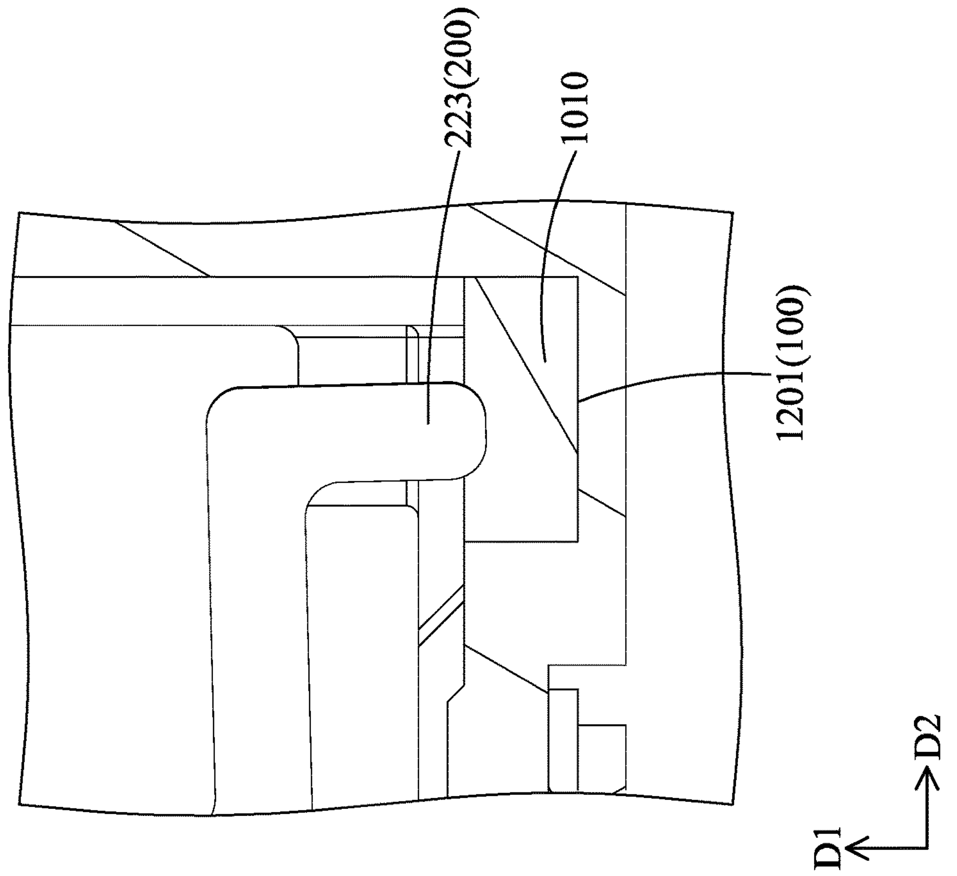

FIGS. 10A and 10B show partial cross-sectional views of the movable portion 200 at different positions within a range of motion relative to the fixed portion 100. As shown in FIGS. 10A and 10B, the first linking structure 223 will maintain contact with the first restraining element 1010 at any position within the range of motion of the movable portion 200 relative to the fixed portion 100.

In this way, the resonance generated when the optical module 10 is impacted or shaken can be restrained. The resonance generated when the optical module 10 is impacted or shaken will affect the focus of the optical module. With the arrangement of the restraining component 1000 of the present invention, abnormal movement of the movable portion relative to the fixed portion can be restrained, thereby achieving better focusing and imaging results.

To sum up, the present invention provides an optical module, which includes a movable portion with a linking structure. The linking structure contacts a restraining element disposed on the fixed portion to restrain the abnormal movement of the movable portion relative to the fixed portion, thereby achieving better focusing and imaging results.

The ordinal numbers in this specification and the claim, such as "first", "second", etc., have no sequential relationship with each other and are only used to identify two different components with the same name.

While the embodiments and advantages of the present disclosure have been disclosed above, it should be understood that modifications, substitutions, and alterations can be made by those skilled in the art without departing from the spirit and scope of the present disclosure. Furthermore, the scope of protection of the present disclosure is not limited to the processes, machines, manufacturing, material compositions, devices, methods, and steps described in the specific embodiments in the specification. Those skilled in the art can understand processes, machines, manufacturing, material compositions, devices, methods, and steps developed currently or in the future from the disclosure of the present disclosure, as long as they can achieve substantially the same function or obtain substantially the same result as in the embodiments described herein. Therefore, the scope of protection of the present disclosure includes the aforementioned processes, machines, manufacturing, material compositions, devices, methods, and steps. Additionally, each claimed patent scope constitutes an individual embodiment, and the scope of protection of the present disclosure includes combinations of each claimed patent scope and embodiment.

The above embodiments are described in sufficient detail so that those skilled in the art can implement the device disclosed in the present disclosure through the descriptions provided above. It should be understood that, without departing from the spirit and scope of the present disclosure, slight modifications and embellishments can be made.

Therefore, the scope of protection of the present disclosure should be determined according to the appended claims.

What is claimed is:

1. An optical module, comprising:
a fixed portion;
a movable portion connecting an optical element;
a driving component configured to drive the movable portion to move relative to the fixed portion;
a restraining component to restrain abnormal movement of the movable portion relative to the fixed portion;
wherein, the movable portion is movable within a range of motion relative to the fixed portion;
wherein the fixed portion comprises a surface;
wherein the restraining component comprises:
a first restraining element, made of plastic material and in direct contact with the movable portion and the fixed portion;
a first containing structure, having a recessed structure, wherein the first restraining element is at least partially located in the first containing structure;
a first linking structure, directly contacting the first restraining element and at least partially located in the first containing structure; and
wherein the first containing structure is recessed from the surface along a recessed direction, and when viewed in a direction perpendicular to the recessed direction, the first linking structure at least partially overlaps with the first containing structure, the first linking structure has a long strip structure and extends in a direction parallel to the recessed direction.

2. The optical module as claimed in claim 1, wherein the length of the first linking structure extending into the first restraining element in the recessed direction is at least more than 0.05 mm, and the first linking structure is made of metal.

3. The optical module as claimed in claim 1, wherein the first linking structure is made of different materials than the surface, when the movable portion is located at any position in the range of motion, the first linking structure does not directly contact the first containing structure.

4. The optical module as claimed in claim 1, wherein the restraining component further comprises:
a second restraining element, arranged with the first restraining element along a first arrangement direction;
a second linking structure, directly contacting the second restraining element; and
a first reinforcing element, made of magnetically permeable material, and located between the first linking structure and the second linking structure, and corresponding to the driving component.

5. The optical module as claimed in claim 4, wherein the first linking structure and the second linking structure have an integrally formed structure, and the first arrangement direction is not parallel to the recessed direction.

6. The optical module as claimed in claim 4, wherein the movable portion comprises a carrier connected to the optical element, and the carrier is made of plastic material.

7. The optical module as claimed in claim 6, wherein the first linking structure is fixedly disposed on the carrier, and the first linking structure is at least partially embedded in the carrier, the first reinforcing element is fixedly disposed on the carrier.

8. The optical module as claimed in claim 6, further comprising a support component, wherein the movable portion is movable relative to the fixed portion via the support component, and the support component comprises a support element that is movable relative to the movable portion or the fixed portion.

9. The optical module as claimed in claim 8, wherein the restraining component further comprises a second reinforcing element, the support element corresponds to the second reinforcing element, the second reinforcing element has a plate-like structure, the second reinforcing element and the support element are made of metal material.

10. The optical module as claimed in claim 9, wherein the support element is fixedly connected to the second reinforcing element, the second reinforcing element and the first reinforcing element have an integrally formed structure, the second reinforcing element is fixedly disposed on the carrier, the second reinforcing element is at least partially embedded in the carrier.

11. The optical module as claimed in claim 8, wherein the support component further comprises:
an elastic element, the movable portion is movably connected to the fixed portion via the elastic element, wherein the elastic element comprises:
a movable portion fixed end, fixedly connected to the movable portion;
a fixed portion fixed end, fixedly connected to the fixed portion; and
an elastic portion, having a flexible structure, and the movable portion fixed end is movable relative to the fixed portion fixed end via the elastic portion;
wherein, the fixed portion comprises a fixing element, the fixed portion fixed end is disposed on the fixing element, the elastic element and the fixing element both have a plate-like structure, and a thickness direction of the elastic element and a thickness direction of the fixing element are parallel to each other.

12. The optical module as claimed in claim 11, wherein the fixing element further comprises:
a first opening, wherein when viewed along the thickness direction of the fixing element, the movable portion fixed end is at least partially exposed from the first opening;
a second opening, wherein when viewed along the thickness direction of the fixing element, the movable portion fixed end is at least partially exposed from the second opening;
a third opening, wherein when viewed along the thickness direction of the fixing element, the fixed portion fixed end is at least partially exposed from the third opening; and
a fourth opening, wherein when viewed along the thickness direction of the fixing element, the fixed portion fixed end is at least partially exposed from the fourth opening.

13. The optical module as claimed in claim 12, wherein an arrangement direction of the first opening and the second opening is different from an arrangement direction of the third opening and the fourth opening, and the area of the first opening is larger than the area of the second opening.

14. The optical module as claimed in claim 12, wherein a line connecting a center of the third opening and a center of the fourth opening does not pass through a center of the fixing element when viewed in the thickness direction of the fixing element, and the line connecting the center of the third opening and the center of the fourth opening partially overlaps the second opening when viewed along the thickness direction of the fixing element.

15. The optical module as claimed in claim 4, wherein the restraining component further comprises:

a first setting portion;

a second setting portion; and a third restraining element, made of plastic material, and in direct contact with the movable portion and the fixed portion;

wherein, the third restraining element is disposed on the first setting portion and the second setting portion, the first setting portion and the second setting portion are respectively located on the movable portion and the fixed portion, and the first setting portion does not overlap the second setting portion in a extending direction of the first setting portion.

16. The optical module as claimed in claim 15, wherein the first arrangement direction and a second arrangement direction are located on opposite sides of the center of the optical element when viewed along a first axis; the first arrangement direction and the second arrangement direction are located on opposite sides of the center of the optical element when viewed along a second axis.

17. The optical module as claimed in claim 16, wherein the first restraining element, the second restraining element and the third restraining element are located on an imaginary plane, the imaginary plane is not parallel to the first axis, the imaginary plane is not perpendicular to the first axis, the first axis is perpendicular to the second axis, the first arrangement direction is parallel to the second arrangement direction, and the first arrangement direction is perpendicular to the first axis, the first arrangement direction is perpendicular to the second axis.

18. The optical module as claimed in claim 17, wherein the restraining component further comprises a fourth restraining element, the fourth restraining element is arranged with the third restraining element along the second arrangement direction, the first restraining element, the second restraining element, the third restraining element and the fourth restraining element are located on the imaginary plane.

* * * * *